United States Patent [19]
Sato

[11] Patent Number: 5,257,960
[45] Date of Patent: Nov. 2, 1993

[54] SYSTEM FOR CONTROLLING A CONTINUOUSLY VARIABLE

[75] Inventor: Keiji Sato, Tokyo, Japan

[73] Assignee: Fuji Jukogyo Kabushiki Kaisha, Tokyo, Japan

[21] Appl. No.: 776,134

[22] Filed: Oct. 15, 1991

[30] Foreign Application Priority Data

Oct. 31, 1990 [JP] Japan .................. 2-294382

[51] Int. Cl.$^5$ ........................... F16H 59/00
[52] U.S. Cl. ........................ 474/69; 474/28
[58] Field of Search ............. 474/18, 28, 69, 70; 74/866–869

[56] References Cited

U.S. PATENT DOCUMENTS 4,767,382  8/1988  Tezuka et al. .................. 474/28
4,923,433  5/1990  Tanaka et al. .................. 474/28

FOREIGN PATENT DOCUMENTS 61-74951  4/1986  Japan .

*Primary Examiner*—Thuy M. Bui
*Attorney, Agent, or Firm*—Martin A. Farber

[57] ABSTRACT

A continuously variable belt-drive transmission has a primary pulley operatively connected to an engine and a secondary pulley operatively connected to wheels of a motor vehicle, a primary cylinder and a secondary cylinder, and a hydraulic circuit having an oil pump. Primary pressure for the primary cylinder is generated by reducing secondary pressure. Steady flow rate in the primary system in a steady state is calculated, and transient flow rate in the primary system in a transient state is calculated. A primary pressure changing rate is determined to the value that the sum of secondary flow rate, the steady flow rate, and the transient flow rate becomes smaller than a discharge flow rate of the pump. In response to the primary pressure changing rate, a primary pressure control valve is operated so as to maintain balance of flow rate between the primary system and the secondary system.

5 Claims, 4 Drawing Sheets

SYSTEM FOR CONTROLLING A CONTINUOUSLY VARIABLE

BACKGROUND OF THE INVENTION

The present invention relates to a hydraulic control system for a continuously variable transmission for a motor vehicle, and more particularly to a control system for controlling flow rate of oil in the transmission.

A known control system for a continuously variable transmission comprises an endless belt running over a primary pulley and a secondary pulley. Each pulley comprises a movable conical disc which is axially moved by a fluid operated servo device so as to vary a running diameter of the belt on the pulleys in dependency on driving conditions. The system is provided with a hydraulic circuit including a pump for supplying oil to the servo devices, a secondary pressure control valve and a primary pressure control valve. Each valve comprises a spool to control the oil supplied to the servo devices.

The system is employed with an electronic control system for controlling valves of the hydraulic circuit.

Flow rate of the oil from the oil pump is regulated by the secondary pressure control valve to produce a secondary pressure. The secondary pressure is reduced by the primary valve to produce a primary pressure. The primary pressure is applied to a primary cylinder of the primary pulley, and the secondary pressure is applied to a secondary cylinder of the secondary pulley for controlling transmission ratio. The flow rate of the oil is regulated in accordance with the various conditions. If the flow rate and the primary pressure largely change by a transmission control signal, the changes of the flow rate and the pressure effect the secondary pressure. Namely, when the primary pressure is increased at upshift of the transmission to expand the primary cylinder, there occur increases of compression pressure of air in the cylinder, leakage of the oil, and deformation of the cylinder. Therefore, it is necessary to supply the oil at a larger flow rate than that of a necessary pressure in the primary cylinder, as shown in FIG. 3. In particular, this phenomenon of requiring much oil is remarkable when the primary pressure rises from zero.

If a large amount of the primary pressure is required, the oil flow rate applied to the primary cylinder becomes unbalance. As a result, the secondary pressure reduces to cause belt slipping and malfunction of the transmission. To eliminate these disadvantages, it is necessary to control the transmission with properly maintaining the balance of the oil flow rate between the primary system and the secondary system.

Japanese Patent Application Laid-open 61-74951 discloses a hydraulic system for a continuously variable belt-drive transmission. The system has a regulator valve provided between an oil pump and a primary cylinder, and a bypass provided around the regulator valve. When oil leaks from the cylinder, a corresponding amount of the oil is supplied through the bypass to the cylinder.

However, since a large amount of the oil is supplied only to the primary cylinder, the secondary pressure is liable to reduce. Therefore, if the transmission is upshifted at a low engine speed, where flow rate of the oil is small, the secondary pressure is largely reduced.

SUMMARY OF THE INVENTION

An object of the present invention is to provide a control system for a continuously variable belt-drive transmission which may balance the flow rate of oil in a hydraulic circuit, thereby preventing a belt from slipping.

According to the present invention, there is provided a system for controlling a belt-drive continuously variable transmission for transmitting power of an engine to wheels of a motor vehicle, the transmission having a primary pulley operatively connected to the engine, a secondary pulley operatively connected to the wheels, an endless belt running over the primary and secondary pulleys, a primary cylinder and a secondary cylinder for changing effective diameters of both pulleys, and a hydraulic circuit having an oil pump driven by the engine, a secondary system including a secondary pressure control valve for generating a secondary pressure applied to the secondary cylinder, and a primary system including a primary pressure control valve for generating a primary pressure by reducing the secondary pressure, the primary pressure being applied to the primary cylinder.

The system comprises discharge flow calculator means for calculating a discharge flow rate of the oil pump, secondary flow means for calculating a secondary flow rate in the secondary system, steady flow calculator means for calculating a steady flow rate in the primary system, transient flow calculator means for calculating a transient flow rate in the primary system, determining means for determining a primary pressure changing rate to such a value that the sum of the secondary flow rate, the steady flow rate, and the transient flow rate becomes smaller than the discharge flow rate, and control means responsive to the primary pressure changing rate for controlling the primary pressure control valve.

Thus, balance of flow rate between the primary system and the secondary system can be maintained.

In an aspect of the invention, the discharge flow rate and the secondary flow rate are calculated based on the second pressure and temperature of oil.

The other objects and features of this invention will become understood from the following description with reference to the accompanying drawings.

DETAILED DESCRIPTION OF THE PREFERRED EMBODIMENT

Figure 1:
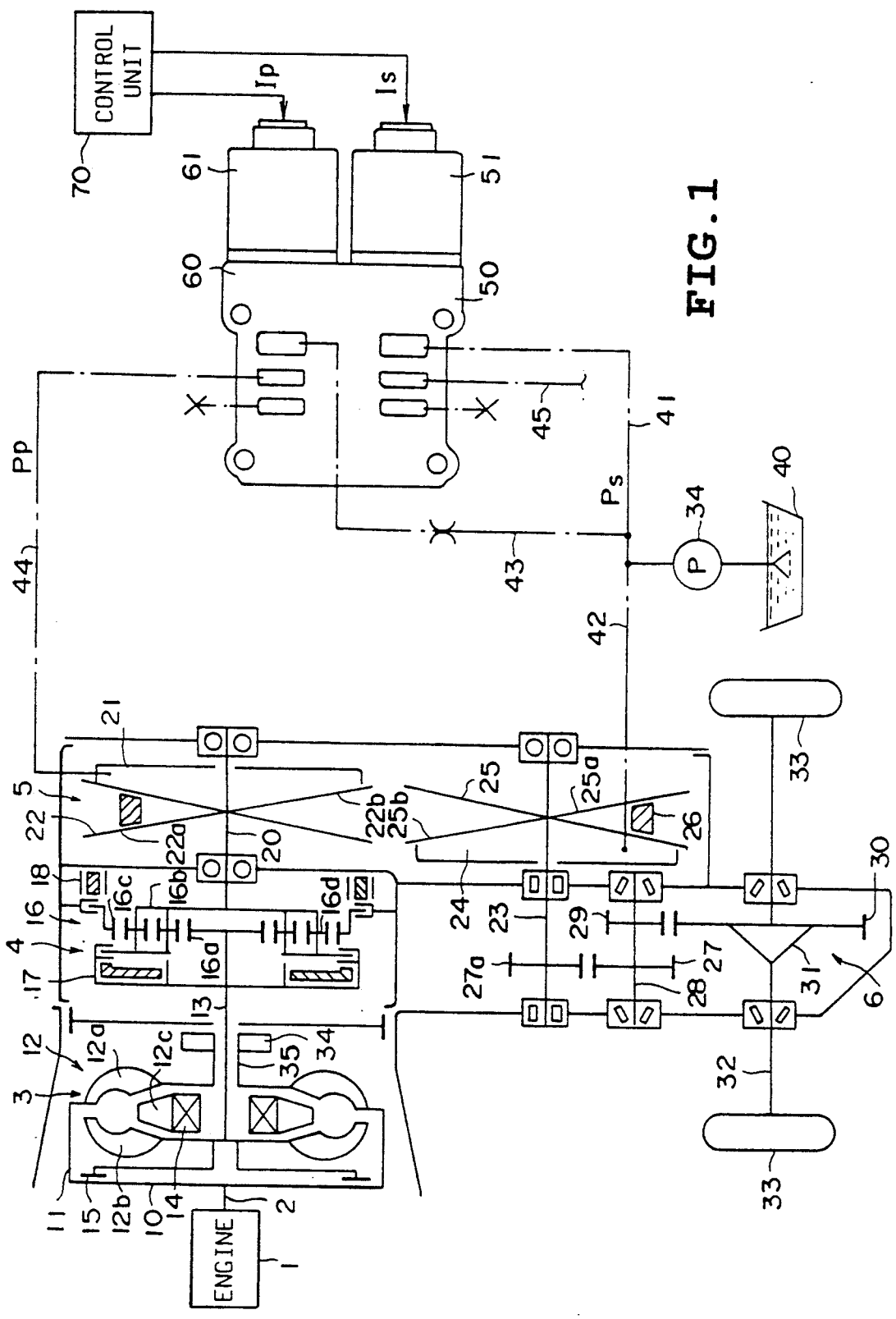
FIG. 1 shows a schematic diagram of a continuously variable belt-drive transmission to which the present invention is applied.

FIG. 1 shows a two-wheel drive power transmission system with a continuously variable belt-drive automatic transmission for a motor vehicle, to which the present invention is applied. An engine 1 is mounted on the motor vehicle at a front portion thereof. The power transmission system comprises a torque converter device 3, a selector device 4, a continuously variable belt-drive transmission 5, and a final reduction and differential device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a integral with the converter cover 11, a turbine 12b connected to an input shaft 13, and a stator 12c connected to a one-way clutch 14. The lockup clutch 15 is disposed between the converter cover 11 and the torque converter 12 for contacting the cover 11.

The selector device 4 comprises a planetary gear 16 having a pair of pinions 16d, and a sun gear 16a mounted on the input shaft 13. The pinions 16d are supported on a carrier 16b. The sun gear 16a is engaged with a ring gear 16c through the pinions 16d. A forward clutch 17 is disposed between the sun gear 16a and the carrier 16b. A reverse brake 18 is disposed between the ring gear 16c and a main case. At forward driving such as a drive range (D) selection, the forward clutch 17 is engaged to rotate the carrier 16b with the sun gear 16a. At reverse driving, the reverse brake 18 is engaged to lock the ring gear 16c for reversely rotating the carrier 16b.

The belt-drive transmission 5 has a main shaft 20 engaged with the carrier 16b and an output shaft 23 provided in parallel with the main shaft 20. A primary pulley 22 and a secondary pulley 25 are mounted on the main shaft 20 and output shaft 23, respectively. A fixed conical disc 22a of the primary pulley 22 is integral with main shaft 20 and an axially movable conical disc 22b is axially slidably mounted on the main shaft 20. The movable conical disc 22b also slides in a primary cylinder 21 formed on the main shaft 20 to provide a servo device.

A fixed conical disc 25a of a secondary pulley 25 is formed on output shaft 23 opposite the movable conical disc 22b and a movable conical disc 25b is slidably mounted on the shaft 23 opposite the disc 22a. The movable conical disc 25b has a cylindrical portion which is slidably engaged in a secondary cylinder 24 of the output shaft 23 to form a servo device. A drive belt 26 engages with the primary pulley 22 and the secondary pulley 25. The cylinder 21 of the drive pulley 22 is so designed that the pressure receiving area thereof is larger than that of the cylinder 24 of the secondary pulley 25. Thus, the effective diameter of the pulleys 22, 25, that is the running diameter of the belt 26 on the pulleys 22, 25 is varied dependent on driving conditions.

A drive gear 27a of the final reduction device 6 is secured to the output shaft 23 and engages with an intermediate reduction gear 27 on an intermediate shaft 28. An intermediate gear 29 on the shaft 28 engages with a final reduction gear 30. The rotation of the final reduction gear 30 is transmitted to axles 32 of vehicle driving wheels 33 through a differential 31.

Adjacent the torque converter 12, a main oil pump 34 is provided for supplying a high pressurized oil for the transmission. An oil pump drive shaft 35 is connected to the impeller 12a and is operatively connected with the converter cover 11. The oil pump 34 is a roller vane type pump having a plurality of inlet and outlet ports as a variable displacement pump.

Oil in an reservoir 40 is supplied to a secondary pressure control valve 50 through a passage 41 by the pump 34 for producing a predetermined secondary pressure Ps. An oil passage 42 connected to the passage 41 is communicated with the cylinder 24 of the secondary pulley 25, so that the secondary pressure Ps is applied to the secondary cylinder 24. The passage 41 is further communicated with a primary pressure control valve 60 through a passage 43 so that the secondary pressure Ps is applied to the primary pressure control valve 60. The primary cylinder 21 of primary pulley 22 is applied with a primary pressure Pp through the primary pressure control valve 60 and a passage 44. Thus, there are provided a primary system comprising the passages 43, 44 and the primary pressure control valve 60, and a secondary system comprising the passage 41, 42 and the secondary pressure control valve 50.

The secondary pressure control valve 50 is a type of a proportional solenoid operated relief valve having a proportional solenoid 51. The primary pressure Pp is generated by reducing the secondary pressure Ps as described hereinafter.

The proportional solenoid 51 is adapted to be operated by solenoid current Is supplied from a control unit 70. The current Is produces electromagnetic force which acts to urge a spool of the secondary pressure control valve 50. The secondary pressure Ps is automatically set to a value at which the secondary pressure balances with the sum of the electromagnetic force and spring force applied to the spool. Namely, the secondary pressure is controlled by the current Is.

The primary pressure control valve 60 is a type of a proportional solenoid operated reducing valve having a proportional solenoid 61.

The proportional solenoid 61 is also operated by solenoid current Ip from the control unit 70. The current Ip produces electromagnetic force to control the primary pressure Pp in the same manner as the secondary pressure control valve 50.

A comparatively high lubricating pressure is produced in a drain passage 45 of the secondary pressure control valve 50. The lubricating pressure is applied to the torque converter 12, the selector device 4 and the belt 26.

Figure 2A:
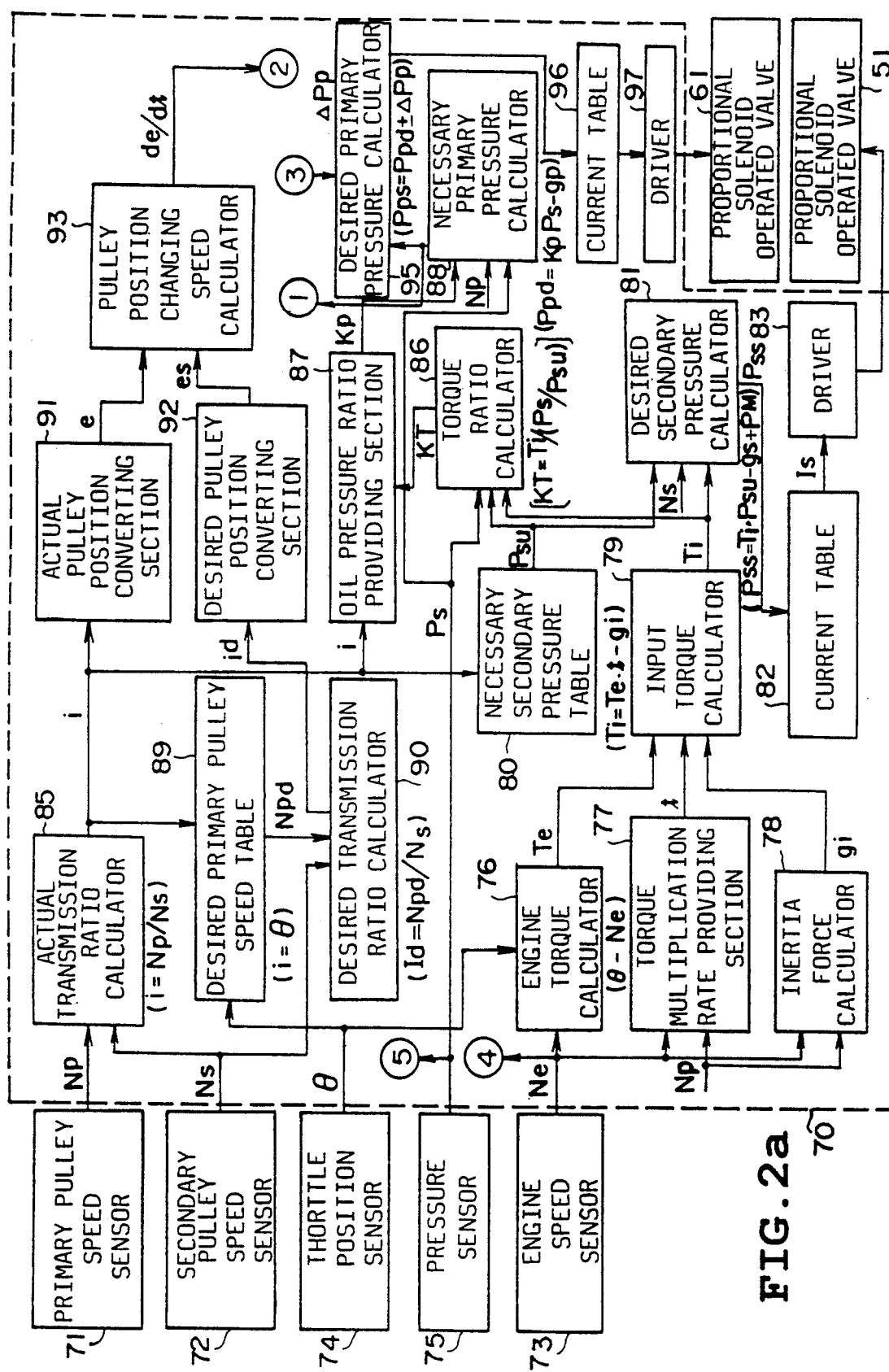
FIGS. 2a and 2b show a block diagram of a control unit of the present invention.
Figure 2B:
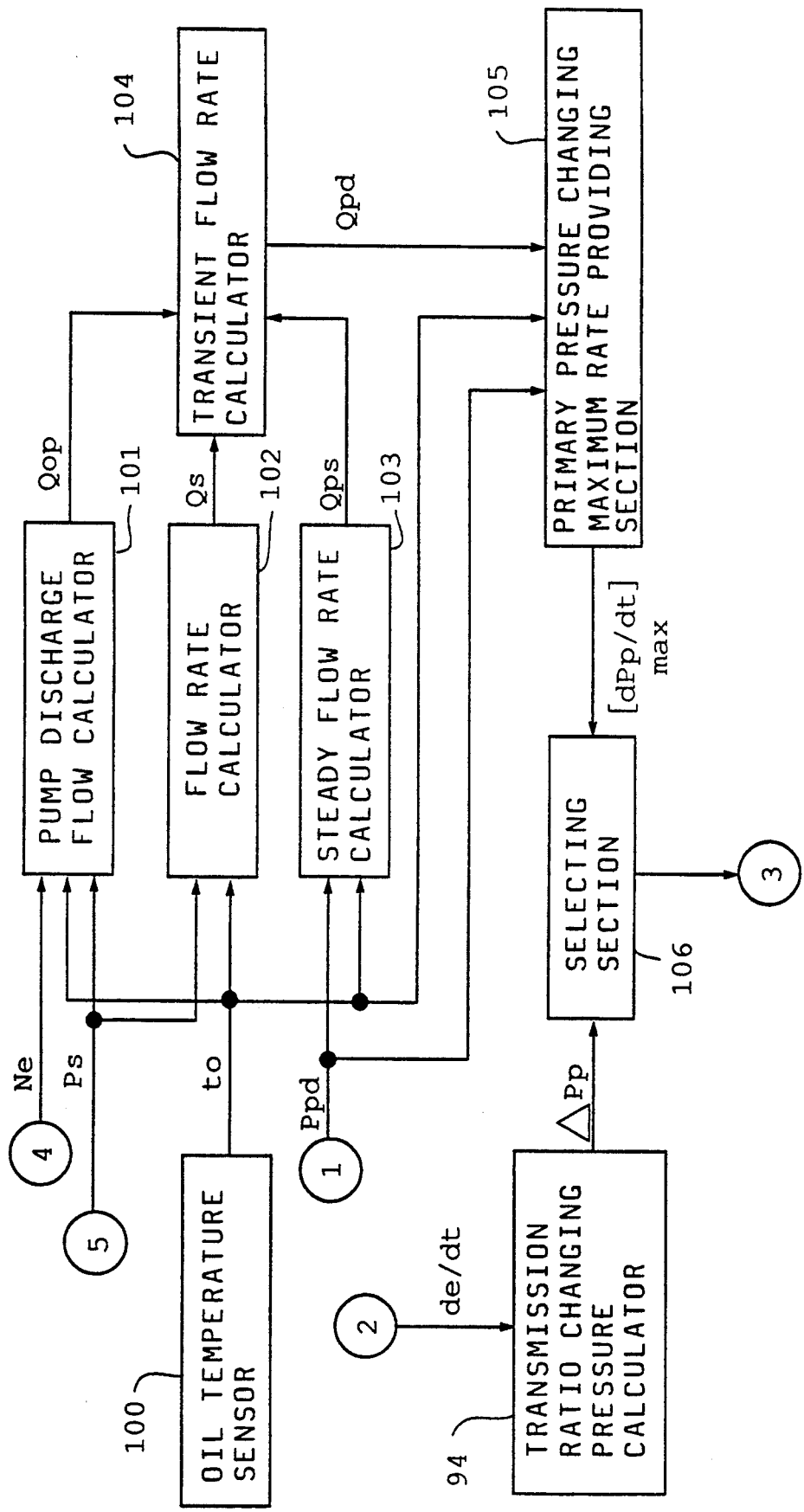

Referring to FIGS. 2a and 2b showing the electronic control system, a primary pulley speed sensor 71, a secondary pulley speed sensor 72, an engine speed sensor 73, a throttle position sensor 74, and a pressure sensor 75 for detecting the second pressure Ps are provided.

Output signals Np and Ns of the sensors 71, 72 are fed to an actual transmission ratio calculator 85 to produce an actual transmission ratio i in accordance with i=Np/Ns. Describing the operation for controlling the secondary pressure, a throttle position signal $\theta$ of the throttle position sensor 74 and an engine speed signal Ne of the engine speed sensor 73 are fed to an engine torque calculator 76, so that an engine torque Te is calculated based on the throttle position signal $\theta$ and the engine speed Ne. The engine speed Ne and the primary pulley speed Np are applied to a torque multiplication rate providing section 77. In the providing section 77, a speed ratio n of the torque converter 12 is calculated in accordance with n=Np/Ne when the transmitting torque is varied in accordance with the increase of the torque of the torque converter 3. A torque multiplication rate t is derived from a table in dependency on the speed ratio n. The engine speed Ne and the primary pulley speed Np are applied to an inertia force calculator 78 where an inertia force gi is calculated in accordance with mass and acceleration of the engine 1 and the primary pulley 22. The engine torque Te, the torque multiplication rate t and the inertia force gi are applied to an input torque calculator 79, so that an input torque Ti to the transmission is calculated by $$Ti = Te \cdot t - gi$$

On the other hand, the actual transmission ratio i from the calculator 85 is applied to a necessary secondary pressure table 80 to derive a necessary secondary pressure Psu per unit torque from a look-up table. The necessary secondary pressure Psu and the input torque Ti are applied to a desired secondary pressure calculator 81 to which the primary pulley speed Ns is applied. In the calculator 81, a desired secondary pressure Pss is calculated in consideration of a centrifugal pressure gs in the cylinder 24 as follows.

$$Pss = Ti \cdot Psu - gs$$

The desired secondary pressure Pss is applied to a solenoid current table 82 to derive a solenoid current Is corresponding to the desired secondary pressure from a look-up table. The solenoid current Is is supplied to a driver 83 which operates the proportional solenoid 51 at the current Is. The secondary pressure Ps is controlled to follow up the desired secondary pressure Pss.

The operation for controlling the primary pressure will be described hereinafter. First, describing an oil pressure ratio control in a steady state of the engine, the control unit 70 is provided with a torque ratio calculator 86 to which the input torque Ti calculated at the calculator 79, the necessary secondary pressure Psu derived from the table 80 and the secondary pressure Ps detected by the pressure sensor 75 are applied for calculating a torque ratio KT by a following equation.

$$KT = Ti/(Ps/Psu)$$

The torque ratio KT is applied to an oil pressure ration table 87 to which the actual transmission ratio i is applied. An oil pressure ratio Kp between the secondary pressure Ps and the primary pressure Pp is determined for maintaining a predetermined actual transmission ratio i at a predetermined torque ratio KT. The oil pressure ratio Kp is represented as an increasing function of the torque ratio KT and a decreasing function of the transmission ratio i. The oil pressure ratio KP and the secondary pressure Ps are applied to a necessary primary pressure calculator 88 where a necessary primary pressure Ppd is calculated in consideration of a centrifugal pressure gp in the cylinder 21 as follows.

$$Ppd = Kp \cdot Ps - gp$$

The primary pressure Ppd necessary for keeping the present actual transmission ratio i in dependency on the present input torque ti in a steady state is obtained in accordance with the secondary pressure Ps.

Describing a flow control in a transient state, the actual transmission ratio i and the throttle opening degree θ from the sensor 74 are fed to a desired primary pulley speed table 89 to derive a desired primary pulley speed Npd in accordance with values of the ratio i and the signal θ(i−θ). the desired primary pulley speed Npd and the secondary pulley speed Ns are fed to a desired transmission ratio calculator 90 to calculate a desired transmission ratio id in accordance with id=Npd/Ns.

An amount of oil V of the cylinder 21 is proportional to an actual pulley position e and the amount of oil V is differentiated with time to obtain a flow rate Q which is proportional to a pulley position changing speed de/dt in the ratio 1:1. Thus, it is preferable to calculate the flow rate Q in accordance with the pulley position changing speed de/dt. The actual transmission ratio i and the desired transmission ratio id are converted into the actual pulley position e and a desired pulley position es at an actual pulley position converting section 91 and a desired pulley position converting section 92, respectively. The actual pulley position e and the desired pulley position es are applied to a pulley position changing speed calculator 93 to produce the pulley position changing speed de/dt from the formula as follows.

$$de/dt = K1 \cdot (es - e) \cdot K2 \cdot des/dt$$

where K1, K2 are coefficients, es−e is a controlling amount dependent on the difference between the desired and actual pulley positions, and des/dt is a correction factor for the advance in operation of the system. The pulley position changing speed de/dt is applied to a transmission ratio changing pressure calculator 94 where a transmission pressure ΔPp is calculated based on the flow in accordance with the changing speed de/dt.

The necessary primary pressure Ppd and the transmission pressure ΔPp are applied to a desired primary pressure calculator 95 to calculate the desired primary pressure Pps. At upshift of the transmission, the desired primary pressure Pps is calculated by Pps=Ppd+ΔPp. At downshift of the transmission, the desired primary pressure Pps is calculated by Pps=Ppd−ΔPp.

The desired primary pressure pps is applied to a solenoid current table 96 to derive solenoid current Ip. The solenoid current Ip is supplied to the proportional solenoid 61 through a driver 97. Thus, the transmission is controlled by feedforward control.

The system for limiting change of the transmission ratio in accordance with the flow rate of oil in various portion of the hydraulic oil pressure control system will be described hereinafter.

First, describing the principle thereof, a discharge flow rate Qop of the oil pump is represented as a function of pump rotating speed Nop, the secondary pressure ps, and oil temperature to as follows.

$$Qop = f(Nop, Ps, To)$$

Necessary flow rate Qs in the secondary system other than the primary system is represented as follows.

$$Qs = f(Ps, To)$$

In the primary system, there is a steady flow rate Qps and a transient flow rate Qpd produced in response to the primary pressure Pp at the upshifting of the transmission. The steady flow rate Qps is represented as follows.

$$Qps = f(Pp, To)$$

The transient flow rate Qpd is represented as a function of the primary pressure Pp, and changing rate dPp/dt of the primary pressure as follows.

$$Qpd = f(Pp, dPp/dt, To, di/dt)$$

Figure 3:
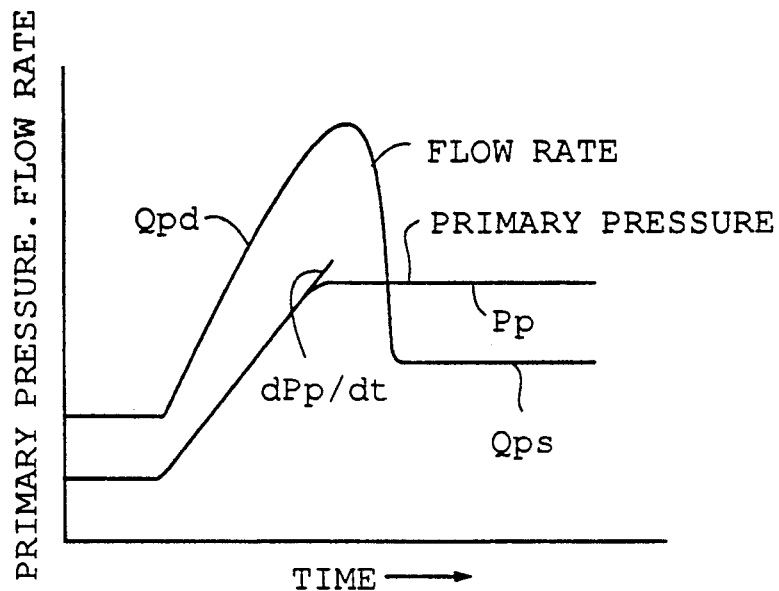
FIG. 3 is a graph showing a relationship between primary pressure and flow rate of oil in transient state at upshifting.

As shown in FIG. 3, as the changing rate dPp/dt of the primary pressure Pp becomes large at the rising thereof, the necessary transient flow rate Qpd becomes large because of increase of the compression rate of air in the primary cylinder 21, deformation of the cylinder, and oil leakage. In order to reduce the transient flow rate Qpd, the primary pressure changing rate dPp/dt should be reduced to moderate the change of the transmission ratio. Consequently, in order to balance the flow rate for preventing the belt from slipping in accordance with the flow rates Qop, Qs, Qps and Qpd, a following condition is necessary.

$$Qop > Qs + Qps + Qpd$$

Namely, it is necessary that the primary pressure change rate dPp/dt determining the transient flow rate Qpd is limited so as to satisfy the above mentioned equation.

In accordance with the present invention, the control unit 70 is provided with pump discharge flow rate calculator 101, a secondary system flow rate calculator 102, and a steady flow rate calculator 103. The discharge flow rate calculator 101 is applied with the engine speed Ne, the secondary pressure Ps, and the oil temperature To detected by an oil temperature sensor 100 for calculating the pump discharge flow rate Qop, the secondary system flow rate calculator 102 is applied with secondary pressure Ps and the oil temperature To for calculating the flow rate Qs in the secondary system, and the steady flow rate calculator 103 is applied with the oil temperature To and the necessary primary pressure Ppd for calculating the steady flow rate Qps. The flow rates Qop, qs and Qps are applied to a transient flow rate calculator 104 in which the transient flow rate Qpd is calculated by a following equation.

$$Qpd = Qop - Qs - Qps$$

The transient flow rate Qpd, the necessary primary pressure Ppd, and the oil temperature To are applied to a primary pressure changing maximum rate providing section 105 for determining a maximum value [dPp/dt]max of the primary pressure changing rate [dPp/dt]. As shown in the look-up table of Fig. 4, the maximum primary pressure changing rate [dPp/dt]max is determined as an increasing function of the transient flow rate Qpd and corrected as a decreasing function of the necessary primary pressure Ppd and the oil temperature To. The maximum changing rate [dPp/dt]max and the transmission ratio changing pressure ΔPp are applied to a selecting section 106. In the selecting section 106, the maximum changing rate [dPp/dt]max is compared with the transmission ratio changing pressure ΔPp and a smaller pressure is applied to the desired primary pressure calculator 95.

The operations of the system will be described hereinafter.

When the engine 1 starts, the oil pump 34 is driven by the oil pump driving shaft 35 and the converter cover 11 to supply pressurized oil to the secondary pressure control valve 50. When the vehicle stops, the primary pressure Pp becomes the lowest pressure. The secondary pressure Ps is applied only to the cylinder 24 of the secondary pulley 25 so that the drive belt 26 engages with the secondary pulley 25 at a maximum running diameter to provide the largest transmission ratio iL (low speed stage).

A hydraulic control system (not shown) is operated to apply the pressurized oil to release the lockup clutch 15. The oil is further supplied to the torque converter 12 so as to operate the converter.

When the D range is selected, the actuating pressure is applied to engage the forward clutch 17, so that the input shaft 13 is engaged with the main shaft 20. Thus, the torque converter 12 operates to transmit the power of the engine 1 to the automatic transmission 5. The power of the engine 1 is transmitted to the output shaft 23 at the largest transmission ratio by the drive belt 26 and the pulleys 22, 25 and further transmitted to axles 32 of the driving wheels 33 through the final reduction device 6. Thus, the vehicle is started.

The engine torque Te is calculated at the engine torque calculator 76 and the torque multiplication rate t and the inertia force gi are calculated accordingly. When the engine torque Te increases dependent on depressing an accelerator pedal at starting of the vehicle, the input torque ti becomes large in accordance with the engine torque te and the rate t to increase the necessary secondary pressure Psu, so that the desired secondary pressure Pss is increased. Thus, a small solenoid current is corresponding to the desired secondary pressure Pss is applied to the proportional solenoid 51 of the secondary pressure control valve 50 to increase a control pressure of the secondary pressure control valve 50. The pressure for draining the oil is reduced to increase the secondary pressure Ps.

After starting of the vehicle, the transmission control is started. When the lockup clutch 15 is engaged, the torque multiplication rate t becomes one (t=1). The necessary secondary pressure Psu is reduced corresponding to the actual transmission ratio i. When the vehicle speed increases, and when the engine torque Te reduces, the desired secondary pressure Pss is reduced. Thus, the solenoid current Is is increased to reduce the control pressure of the secondary pressure control valve 50 to control the secondary pressure Ps.

The secondary pressure is applied to the cylinder 24 to hold the belt 26 at a necessary minimum force. Thus, the power is transmitted through the transmission without slip of the belt 26.

The secondary pressure Ps is applied to the primary pressure control valve 60 which is operated to supply the oil to or drain the oil from the cylinder 21 to change the primary pressure Pp for controlling the transmission.

At the starting of the engine at the maximum transmission ratio iL, the primary pressure Pp is reduced to keep the lowest level. The desired transmission ratio id is gradually reduced and the pulley position changing speed de/dt is calculated at the calculator 93 so that the transmission ratio changing pressure ΔPp is produced to increase the desired primary pressure Pps. The solenoid current Ip is gradually reduced so that the control pressure of the primary pressure control valve 60 is increased in accordance with reduce electromagnetic force of the proportional solenoid 61. Thus, the primary pressure Pp is increased. Diameter of the belt 26 or the primary pulley 22 is increased, thereby upshifting the transmission to a smaller transmission ratio (high speed state).

When the actual transmission ratio i is reduced, the oil pressure ratio Kp is increased at the section 87 to increase the proportion of the necessary primary pressure Ppd to the secondary pressure Ps. The desired primary pressure Pps is increased in accordance with the necessary primary pressure Ppd, in place of the pressure ΔPp, thereby increasing the primary pressure Pp.

For example, if the input torque Ti increases, the torque ratio KT increases at the calculator 86 to increase the oil pressure Kp. Thus, the primary pressure Pp is corrected to increase the value, thereby preventing the downshifting of the transmission.

At the deceleration, when the desired transmission ratio id is increased, the transmission pressure ΔPp is reduced to reduce the desired primary pressure Pps. The solenoid current Ip is increased to reduce the pressure of the control valve 60, so that the primary pressure Pp is controlled to be reduced. The belt 26 is shifted to the secondary pulley 25 to downshift the transmission. The desired primary pressure Pps is reduced to gradually reduce the primary pressure Pp to maintain the actual transmission ratio i.

Consequently, the primary pressure Pp is varied in the entire transmission range between the maximum transmission ratio iL and the minimum transmission ratio iH to control the transmission.

Further, the pump discharge flow rate Qop of the oil pump 43 corresponding to the engine operating conditions, the secondary system flow rate Qs including the secondary pressure Ps corresponding to the transmission ratio i and the input torque Ti, and the steady flow rate Qps corresponding to the primary pressure Pp are calculated by the calculators 101, 102 and 103, respectively. The transient flow rate Qpd is calculated based on these flow rates Qop, Qs and Qps at the calculator 104. The primary pressure changing maximum rate [dPp/dt]max is determined corresponding the transient flow rate Qpd relative to the balance of flow rate, thereby preventing the slip of the driving belt.

Figure 4:
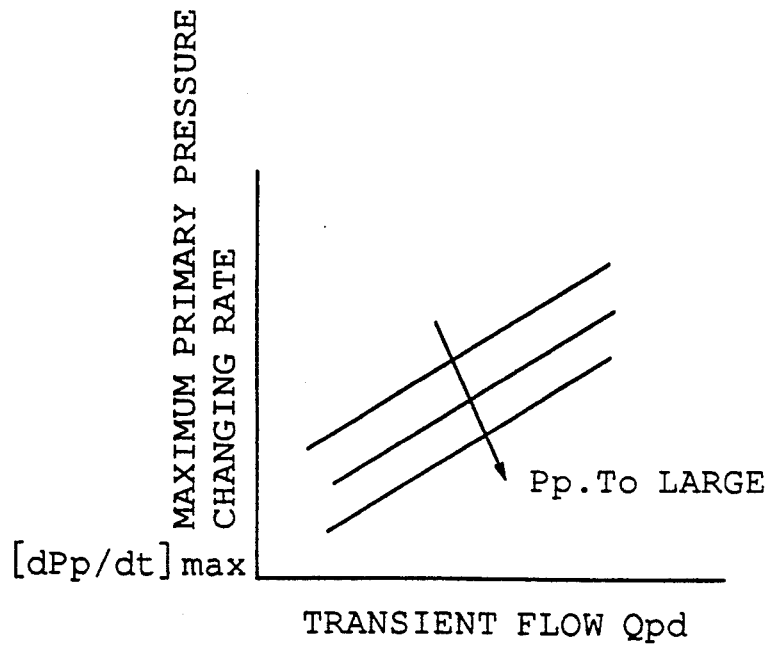
FIG. 4 is a graph showing a lock-up table of a maximum changing rate of the primary pressure.

At the acceleration in the low speed driving, the pump discharge flow rate Qop is small and the secondary pressure Ps is increased. In this state, the transient flow rate Qpd is reduced to reduce the maximum changing rate [dPp/dt]max as shown in FIG. 4. On the other hand, at high speed driving in the steady state, the pump discharge flow rate Qop is increased to reduce the secondary pressure Ps. Thus, the transient flow rate Qpd is increased to increase the maximum changing rate [dPp/dt]max.

In the transient state, the transmission ration changing pressure ΔPp is compared with the maximum changing rate [dPp/dt]max for selecting the smaller pressure. When the transmission is rapidly upshifted by the transmission ratio changing pressure ΔPp at a low engine speed, the pressure ΔPp is limited in accordance with the maximum changing rate [dPp/dt]max. Thus, the oil is applied to the primary cylinder 21 so as not to occur slipping the belt, thereby smoothly upshifting the transmission.

If the maximum changing rate [dPp/dt]max becomes larger than the transmission ratio changing pressure ΔPp, the transmission is upshifted by transmission ratio changing pressure ΔPp.

In the system of the present invention, the primary pressure changing rate dPp/dt can be determined in accordance with the primary pressure Pp, the secondary pressure Ps, the pump rotating speed Nop, and the oil temperature To.

In accordance with the present invention, the transmission ratio is controlled at a value to maintain the balance of the flow rate of oil between the primary system and the secondary system. Thus, the slip of the belt at the upshift of the transmission is prevented. Furthermore, shock at the changing of the transmission ratio is reduced, thereby improving the operation of the transmission. Since the system for controlling the balance of the oil flow rate is additionally provided in the oil flow control system, the transmission is simply and easily controlled.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a belt-drive continuously variable transmission for transmitting power of an engine to wheels of a motor vehicle, the transmission having a primary pulley operatively connected to said engine, a secondary pulley opratively connected to said wheels, an endless belt running over said primary and secondary pulleys, a primary cylinder and a secondary cylinder for changing effective diameters of both pulleys, and a hydraulic circuit having an oil pump driven by said engine, a secondary system including a secondary pressure control valve for generating a secondary pressure applied to said secondary cylinder, and a primary system including a primary pressure control valve for generating a primary pressure by reducing said secondary pressure, the primary pressure being applied to said primary cylinder, the improvement of the system which comprises:
   discharge flow calculator means for calculating a discharge flow rate of said oil pump;
   secondary flow calculator means for calculating a secondary flow rate in said secondary system;
   steady flow calculator means for calculating a steady flow rate in said primary system;
   transient flow calculator means for calculating a transient flow rate in said primary system;
   determining means for determining a primary pressure charging rate to such a value that the sum of said secondary flow rate, said steady flow rate, and said transient flow rate becomes smaller than said discharge flow rate; and
   control means responsive to said primary pressure changing rate for controlling said primary pressure control valve so as to maintain balance of flow rate between said primary system and said secondary system.

2. A system according to claim 1, wherein said discharge flow rate and said secondary flow rate are calculated based on said second pressure and temperature of oil.

3. A system according to claim 1, wherein said transient flow rate is calculated based on said discharge flow rate, secondary flow rate and steady flow rate.

4. A system according to claim 1, further comprising, a sensor for sensing a primary pulley speed;
   a sensor for sensing a secondary pulley speed;
   first calculator means for calculating a desired transmission ratio based on the primary pulley speed and the secondary pulley speed;
   second calculator means for calculating a desired transmission ratio changing speed based on the desired transmission ratio;
   third calculator means for calculating a transmission ratio changing pressure based on said desired transmission ratio changing speed;

selecting means for selecting a smaller one from said primary pressure changing rate and transmission ratio changing pressure;

said control means being responsive to the selected pressure for controlling said primary pressure control valve.

5. A system according to claim 4, wherein said desired transmission ratio changing speed is a pulley position changing speed.

* * * * *